(12) United States Patent
Lu

(10) Patent No.: US 7,137,922 B1
(45) Date of Patent: Nov. 21, 2006

(54) DIFFERENTIAL DEVICE

(75) Inventor: Tai-Yang Lu, Taiping (TW)

(73) Assignee: Taiwan Jet Power Industrial Ltd., Tai Ping (TW)

( * ) Notice: Subject to any disclaimer, the term of this patent is extended or adjusted under 35 U.S.C. 154(b) by 133 days.

(21) Appl. No.: 10/994,586

(22) Filed: Nov. 22, 2004

(51) Int. Cl.
  *F16H 48/06* (2006.01)
(52) U.S. Cl. .................................................... 475/252
(58) Field of Classification Search ............... 475/252, 475/248
  See application file for complete search history.

(56) References Cited

U.S. PATENT DOCUMENTS 2,900,846 A * 8/1959 Lehman ..................... 475/227
3,375,735 A * 4/1968 Saari ......................... 475/249

\* cited by examiner

*Primary Examiner*—Dirk Wright
(74) *Attorney, Agent, or Firm*—Egbert Law Offices

(57) ABSTRACT

A differential device includes a main flywheel, a main shaft integrated with the main central gear, prime train of planet gears, secondary train of planet gears, secondary shaft integrated with the secondary central gear, and a fixing plate. This improved device can resolve problems of current bevel gear-driven differential devices and improve dramatically the drive force and stability of the differential device.

2 Claims, 6 Drawing Sheets

DIFFERENTIAL DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a differential device, and more particularly to a device comprising a main flywheel, a main shaft integrated with the main central gear, prime train of planet gears, secondary train of planet gears, secondary shaft integrated with the secondary central gear, and a fixing plate. The device can be used in transmission systems.

BACKGROUND OF THE INVENTION

A differential device, also known as a differential gear, is commonly used on the transmission mechanism of automobile tires. Since the distance traveled by the left and rights tires when the automobile is making a turn is different, the number of revolution cycles is different too. Herein, a differential device is employed to rotate the left and rights tires in opposite directions, as known as the effect of "differential". Generally, current differential devices achieve countermovement of the two output shafts by gearing drive of bevel gear. However, as the gearing drive between the bevel gear, the input shaft and two output shafts is single side direction, the drive force and its stability of this kind of bevel gear drive structure is far from desirable. Furthermore, as far as a bevel gear is concerned, the augmentation of its size is less likely to bring about effective increases of such variables as modulus and number of teeth, which are critical for the increase of its friction. Consequently, this kind of differential device has little room for any improvement. Therefore, an ideal and practical new differential device offsetting such shortcomings is called for in relevant industry.

In light of this and drawing on years' experiences in the manufacturing and designing work of relevant products, this inventor proposes a practical design after careful evaluation and design to achieve such purposes.

BRIEF SUMMARY OF THE INVENTION

The differential device revealed by this invention features an innovative design consisting of two trains of planet gears and central gears. They are geared with each other at several places and at average intervals. This can resolve the problems of traditional bevel gear differential devices and greatly enhance the drive force and stability. Meanwhile, increasing the size of gears can effectively increase the number of teeth and modulus of each train of gears. Accordingly, the driving friction can be easily controlled. The overall system is quite an improvement in terms of utilization and effectiveness.

The above is the detailed description on the technical features of this invention. Those who are familiar with this technique can adjust and change on compliance with the spirit and principles of this invention. Any such adjustments and changes should be subject to the scope prescribed by the patent.

DETAILED DESCRIPTION OF THE INVENTION

Figure 1:
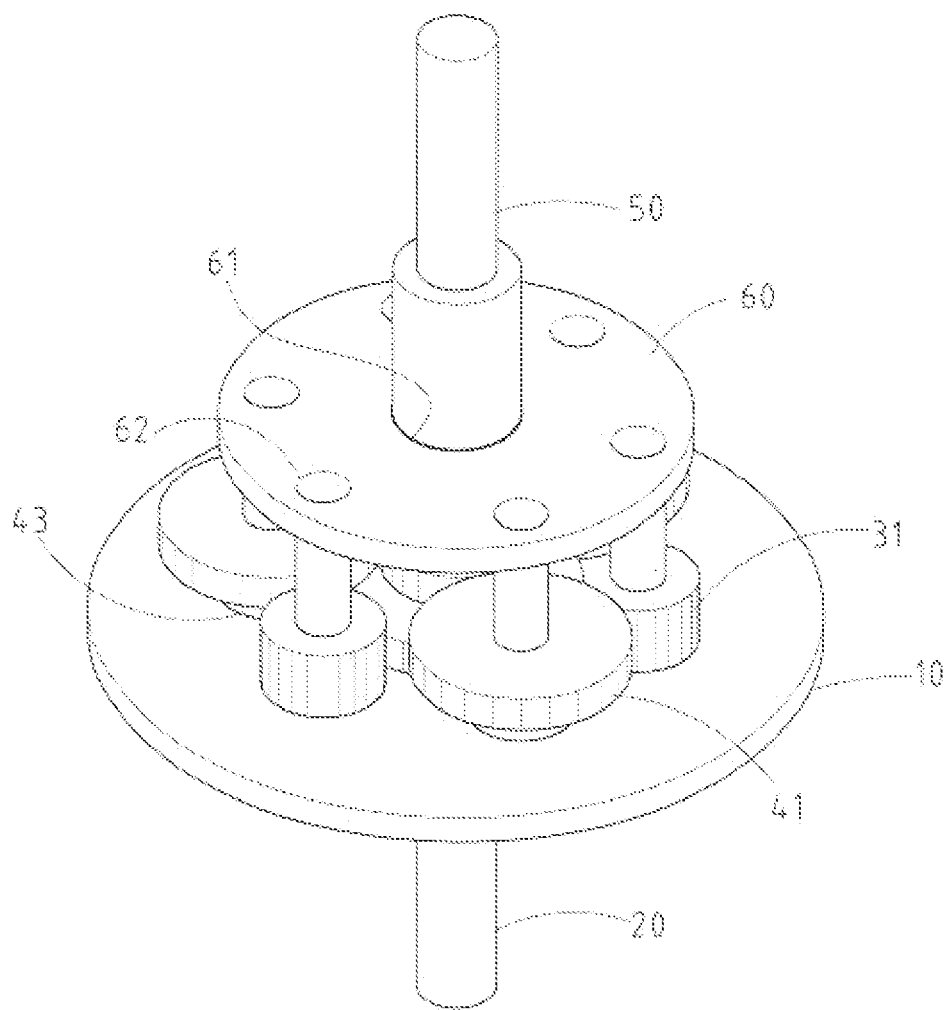
FIG. 1 shows a perspective view of the installed differential device.
Figure 2:
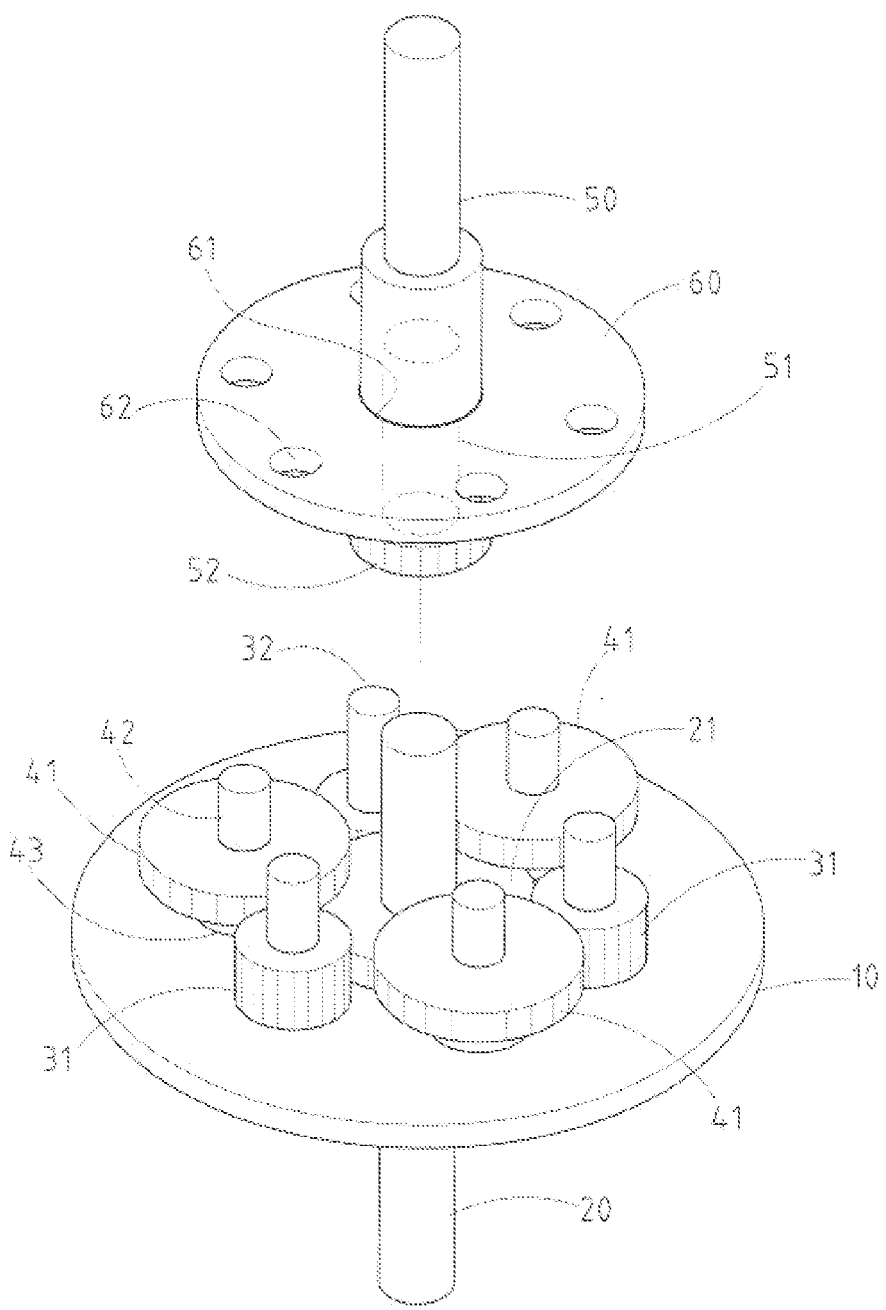
FIGS. 2–4 show the exploded perspective views of the differential device.
Figure 3:
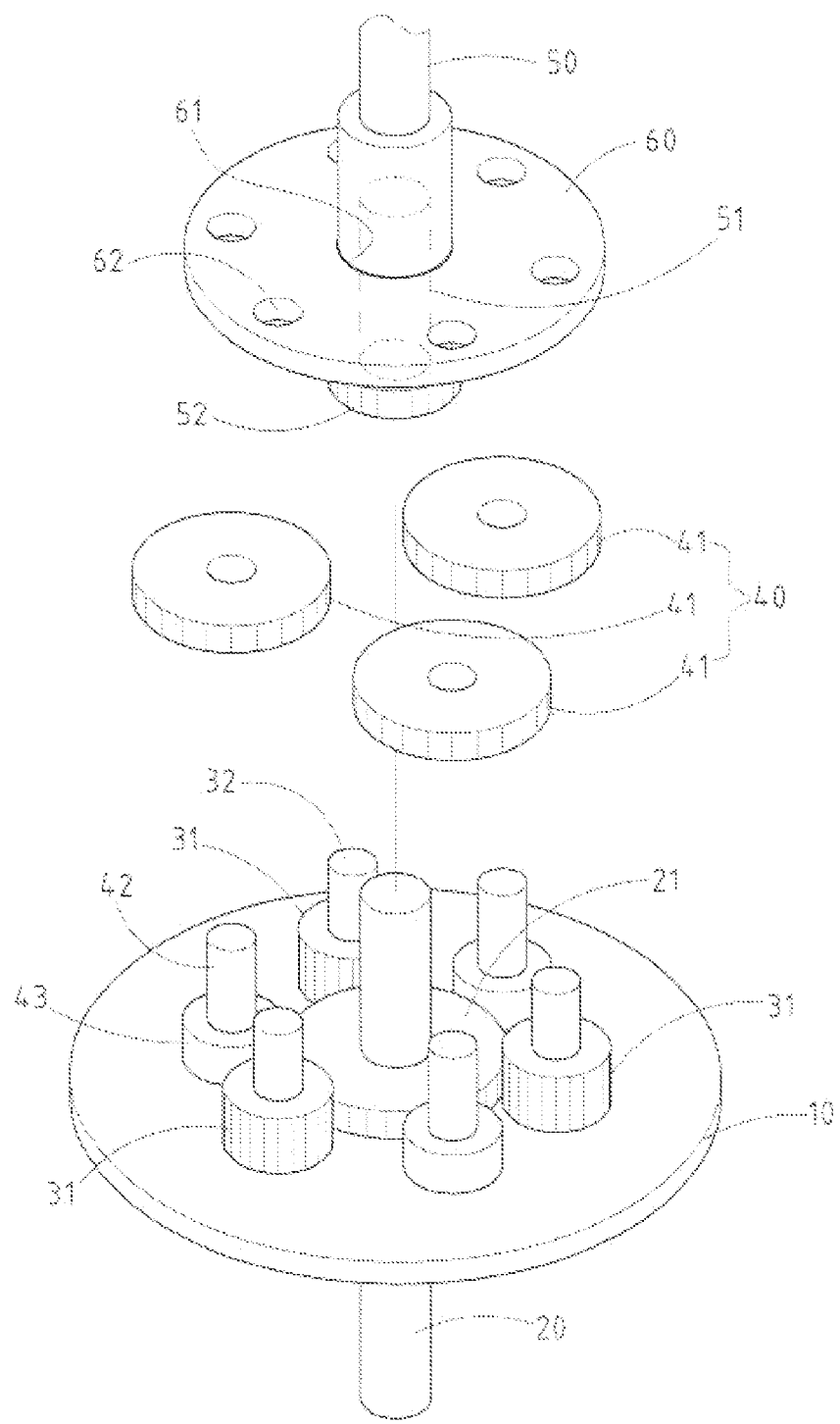
Figure 4:
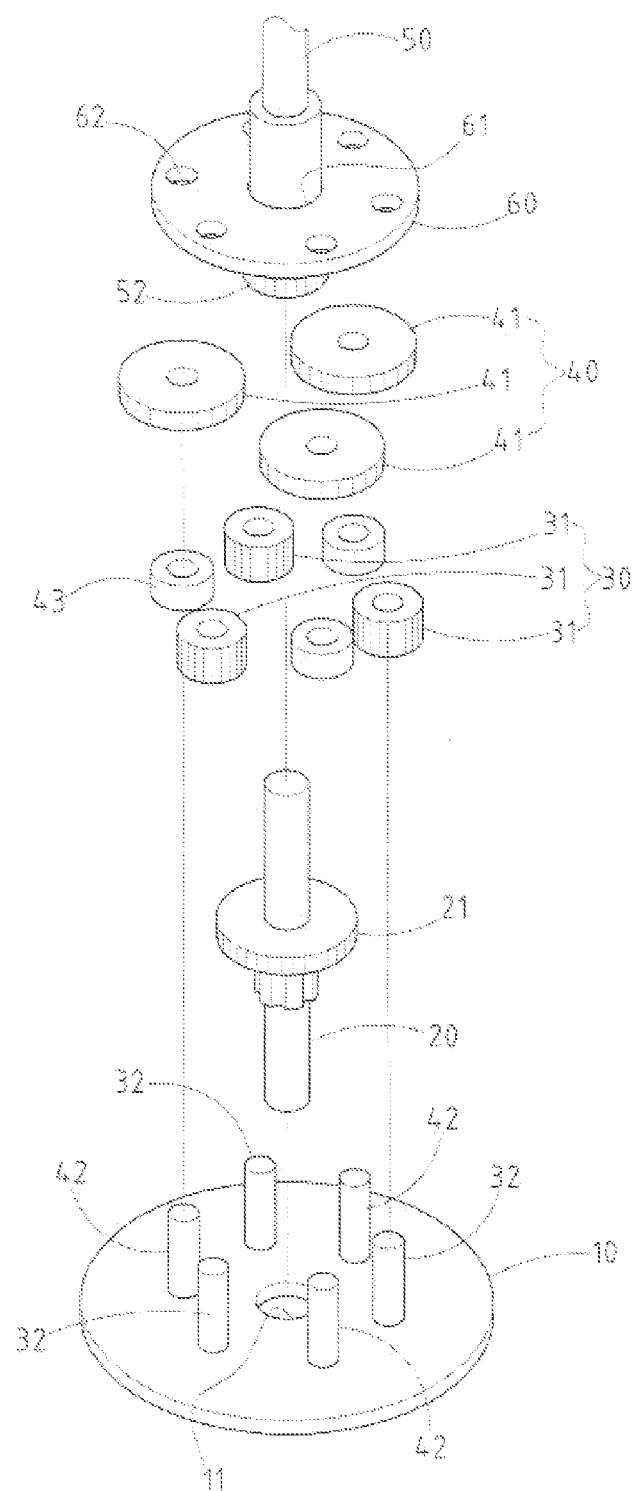

The features and the advantages of the present invention will be more readily understood upon a thoughtful deliberation of the following detailed description of a preferred embodiment of the present invention with reference to the accompanying drawings.

As shown in FIGS. 1–5, a differential device embodied in the present invention comprises: a flywheel 10, which has a center hole 11; a main shaft 20, which penetrates the center hole 11 of the flywheel 10 and whose inner and outer ends stretch on both sides the flywheel 10; and a main central gear 21, which is integrated in the inside of the main shaft 20.

The invention also has a main train of planet gears 30, which consists of several gears 31, each of which is positioned around and connected with the main flywheel 10 at the same axis direction at intervals by jack post 32. The off-center side of each gear 31 is geared up with the main central gear 21 to transmit drive.

There is a secondary train of planet gears 40, which consists of several gears 41, each of which is positioned around and connected with the main flywheel 10 at the same axis direction at intervals by jack post 42. Each gear 41 of the secondary train of planet gears 40 is geared up with corresponding gear 31 of the main train of planet gears 30. The gears 41 of the secondary train of planet gears 40 on the side of the main flywheel 10 are underlaid with space block 43 to be staggered with the main central gear 21.

The invention also includes a secondary shaft 50, which has a central sheath 51 at its inner end to fit the inner end of the main shaft.

There is also a secondary central gear 52 which is fixed at the inner end of the secondary shaft 50 and positioned to geared with the secondary train of the planet gears 40.

The invention has a fixing plate 60, at center of which there is a penetration hole 6 to fit into the secondary shaft 50. The off-center of this fixing plate 60 is planted with fixing holes 62 to fit the jack posts 32 42 of the main and secondary train of planet gears 30 40.

Where all gears 31 of the main train of planet gears 30 are higher than the main central gear 21.

Figure 5:
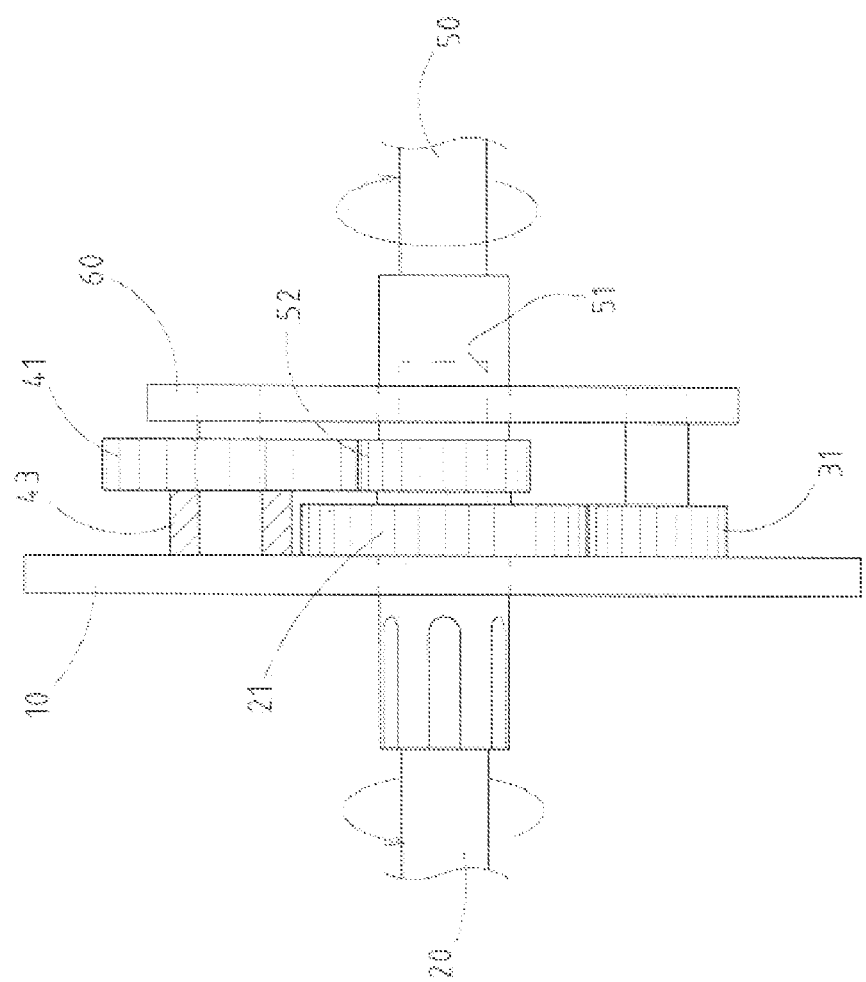
FIG. 5 shows a side elevation view of the installed differential device.
Figure 6:
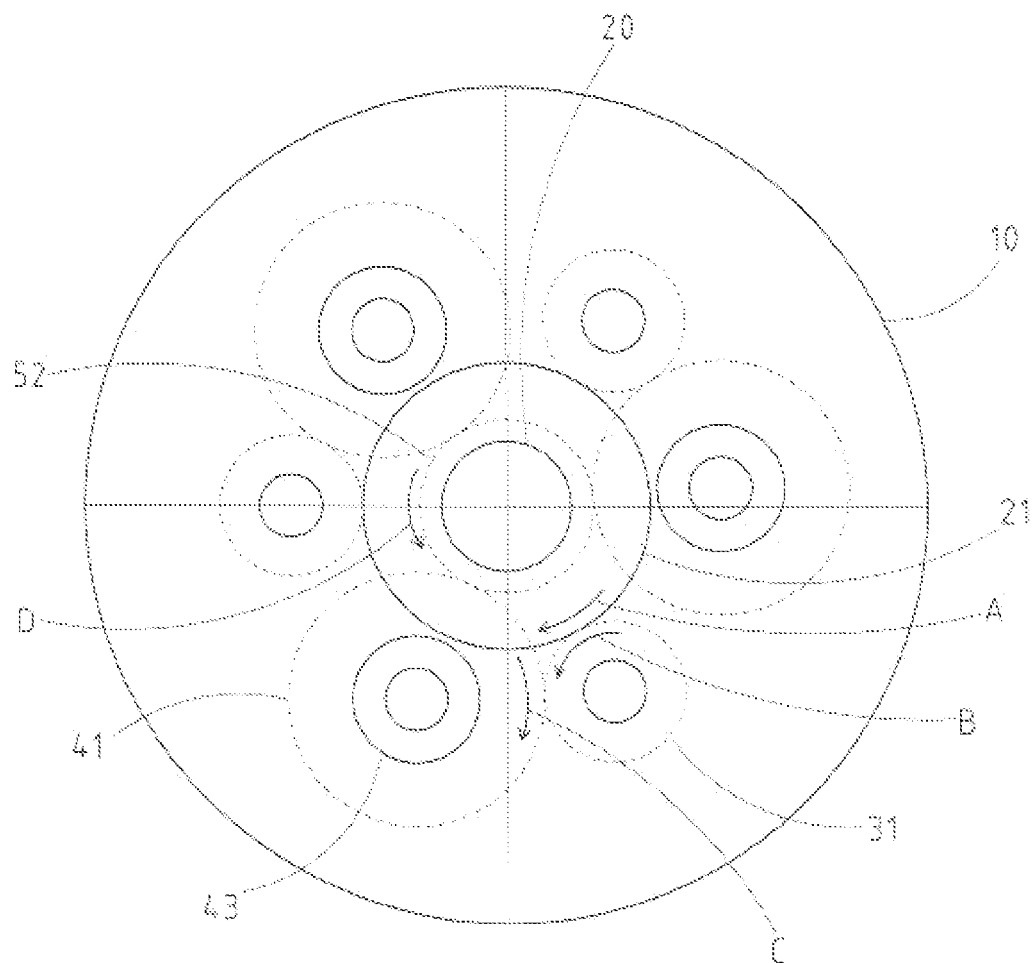
FIG. 6 shows a top plan view of a diagram of the rotational directions of the components of the differential device in operation.

According to above-mentioned innovative design, the differential device revealed in this invention operates as FIGS. 5 and 6. Presume that the main shaft 20 and the first central gear 21 rotate clockwise (as indicated by Arrow A), then the gears 31 of the main train of planet gears rotate in the opposite direction (as indicated by Arrow B). The gears 41 of the secondary train of planet gears would be driven to rotate clockwise (as indicated by Arrow C), which, in turn, drive the geared secondary central gear 52 and the secondary shaft 50 to rotate anti-clockwise (as indicated by Arrow D). Therefore, the main shaft 20 and the secondary shaft 50 would rotate respectively in the opposite direction and at different speed.

I claim:

1. A differential device comprising:
    a flywheel with a center hole;
    a main shaft penetrating said center hole and having inner and outer ends stretched on both sides the flywheel;
    a main central gear integrated in an inside of said main shaft;
    a main train of planet gears, being comprised of several gears, each gear being positioned around and connected to said flywheel at a same axis direction at intervals by a jack post, wherein an off-center side of each gear is geared up with the main central gear transmitting drive;
    a secondary train of planet gears, being comprised of several gears, each gear being positioned around and connected to said flywheel at a same axis direction at intervals by a jack post, each gear of the secondary train of planet gears being geared up with a corresponding gear of the main train of planet gears, wherein the gears of the secondary train of planet gears are underlaid with a space block staggered with the main central gear;
    a secondary shaft with a central sheath at an inner end thereof, fittable into an inner end of the main shaft;
    a secondary central gear fixed at said inner end of the secondary shaft and positioned to be geared with the secondary train of the planet gears; and
    a fixing plate having a penetration hole at center thereof, fittable into the secondary shaft, an off-center of said fixing plate being planted with fixing holes to fit the jack posts of the main and secondary train of planet gears.

2. The differential device defined in claim 1, wherein the gears of the main train of planet gears are positioned higher than the main central gear.

* * * * *